United States Patent [19]

Thome et al.

[11] Patent Number: 5,089,243

[45] Date of Patent: Feb. 18, 1992

[54] METHOD FOR THE PREPARATION OF CRYSTALLINE AND ZEOLITIC ALUMINOSILICATES

[75] Inventors: Roland Thome, Bonn; Hubertus Schmidt, Eitorf; Arno Tissler, Bonn; Dieter Prescher, Schwandorf, all of Fed. Rep. of Germany

[73] Assignee: Vereinigte Aluminium-Werke A.G., Bonn, Fed. Rep. of Germany

[21] Appl. No.: 535,919

[22] Filed: Jun. 11, 1990

[30] Foreign Application Priority Data

Jun. 10, 1989 [DE] Fed. Rep. of Germany ....... 3919098

[51] Int. Cl.$^5$ .............................................. C01B 33/34
[52] U.S. Cl. ..................... 423/328; 423/326
[58] Field of Search ............... 423/326, 328, 329, 330; 502/64, 77

[56] References Cited

U.S. PATENT DOCUMENTS 4,687,654  8/1987  Taramasso et al. ................. 423/329
4,818,509  4/1989  Dwyer et al. ......................... 423/329

FOREIGN PATENT DOCUMENTS 0150256  8/1985  European Pat. Off. .
0206551  2/1984  German Democratic Rep. ..................................... 423/328
0207186  2/1984  German Democratic Rep. ..................................... 423/328

OTHER PUBLICATIONS

Jacobs, et al. *Synthesis of High-Silica Aluminosilicate Zeolites*, Studies in Surface Science and Catalysis, vol. 33, p. 113, Elsevier Amsterdam (1987).

Primary Examiner—R. Bruce Breneman
Attorney, Agent, or Firm—Darby & Darby

[57] ABSTRACT

The present invention relates to a method of preparing crystalline, zeolitic aluminosilicates with $SiO_2/Al_2O_3$ ratios of 20 or more. The method provides a rapid, two-stage crystallization process which avoids the formation of secondary crystalline phases. The first stage is conducted at a temperature between 240° C. and 325° C. for between about 1 and 20 minutes. The second stage is conducted at a temperature between about 120° C. and 225° C. for about 1 to 100 hours.

16 Claims, 1 Drawing Sheet

METHOD FOR THE PREPARATION OF CRYSTALLINE AND ZEOLITIC ALUMINOSILICATES

FIELD OF THE INVENTION

The present invention relates to a method for the preparation of crystalline, zeolitic aluminosilicates with a molar ratio of $SiO_2:Al_2O_3$ of $\geq 20$. More particularly, the zeolitic aluminosilicates are prepared by hydrothermal crystallization from a reaction formulation containing $SiO_2$ and $Al_2O_3$ or their hydrated derivatives or alkali silicates and aluminates, mineralizators, seeding nuclei and, if necessary, organic, structure-directing ammonium compounds in an aqueous, alkaline medium.

BACKGROUND OF THE INVENTION

Pentasil-zeolites are defined by their structure type and more specifically by their XRD. ZSM-5 is one commercial pentasil-zeolite product.

As early as 1967, Argauer and Landolt (U.S. Pat. No. 3,702,886) worked out parameters for the synthesis of pentasil-zeolites, particularly those relating to the following molar ratios:

$OH^-/SiO_2 = 0.07-10$
$SiO_2/Al_2O_3 = 5-100$
$H_2O/SiO_2 = 1-240$

However, the Argauer and Landolt procedure succeeded in synthesizing a reasonably pure phase ZSM-5 zeolite only if organic amines with a structure-giving function (i.e. template function), such as tetrapropyleneammonium compounds were used.

Subsequent to publication of the Argauer and Landolt patent, various publications have disclosed methods of conducting the synthesis of pentasil-zeolites without requiring the very expensive, toxic and easily inflammable organic amine templates. Still other subsequent publications have disclosed substitutes for these amines. In addition to their expense, toxicity and flammability, such amines are disfavored because they are subject to thermal decomposition which can destroy the zeolite structure. Further publications have disclosed modifications of the Argauer and Landolt process directed towards improving the reactivity of the $SiO_2$ and $Al_2O_3$ starting materials.

For example, German Offenlegungsschrift 34 02 842 discloses a method wherein a specially aged aluminosilicate (which is still, however, amorphous to X-rays) is used as a nucleating gel. The method avoids the use of organic amine templates.

EP 0 111 748 discloses aluminosilicates having a zeolite structure and methods for their preparation. The zeolite synthesis is carried out without the addition of an organic compound, but in the presence of aluminum phosphate. However, this method results in zeolites which contain phosphate.

Under normal conditions, the synthesis of zeolites without the use of organic compounds proceeds very slowly. Accordingly, there are no large-scale methods that do not use organic templates for the preparation of high-silica aluminosilicates having a pentasil structure (see *Synthesis of High-Silica Aluminosilicate Zeolites*, by P. A. Jacobs and J. A. Martens, Studies in Surface Science Catalysis 33, 1987, p.143; and *Zeolites as Catalysts, Sorbents and Detergent Builders*, H. G. Karge and J. Weithamp, Studies in Surface Science Catalysis, 46, 1989, p.654).

It is known that formation of aluminosilicates, buildup of the zeolite crystal lattice from $SiO_4^-$ and $AlO_4^-$ tetrahedra, nucleation of zeolites, and zeolite crystal growth all take place by way of reversible reactions. These processes depend on chemical equilibria, which can shift in different directions depending on the temperature, the hydrothermal pressure relationships and the concentrations of reactants (e.g. supersaturated or unsaturated). In synthesizing crystalline aluminosilicate materials, it is desirable to achieve as complete a conversion as possible to the crystalline aluminosilicate while avoiding both secondary phases (such as cristobalite) and an amorphous phase.

High temperatures (i.e., temperatures in excess of 200° C.), and consequent high reaction rates, are advantageous for the formation of crystalline aluminosilicate. However, high temperatures (in excess of 200° C.) increase the probability of forming secondary phases.

OBJECT OF THE INVENTION

It is therefore an object of the present invention to provide a method for the preparation of crystalline, zeolitic aluminosilicates with an $SiO_2:Al_2O_3$ molar ratio of $\geq 20$ by means of hydrothermal crystallization and without the use of organic compounds. This method can be carried out on an industrial scale and yields an crystalline aluminosilicate product which is free of secondary crystalline phases.

SUMMARY OF THE INVENTION

The present invention relates to a method for preparing crystalline zeolite aluminosilicates. The method includes the step of forming a reactant suspension with the following reactant proportions $SiO_2/Al_2O_3 = 20$ to $60$
$OH^-/SiO_2 = 0.10$ to $0.20$
$H_2O/SiO_2 = 20$ to $60$;

The reactant suspension is mixed and heated to a first temperature of between about 240° C. and about 325° C. to form a crystallization broth.

The first temperature is maintained for a time between about 1 and about 20 minutes to provide a first crystallization step. The crystallization broth is then cooled to a second crystallization step temperature of between about 120° C. and about 225° C. A second crystallization step is then conducted at the second temperature for between about 1 and about 100 hours, and a crystalline zeolite aluminosilicate is obtained.

DETAILED DESCRIPTION OF THE INVENTION

Figure 1:
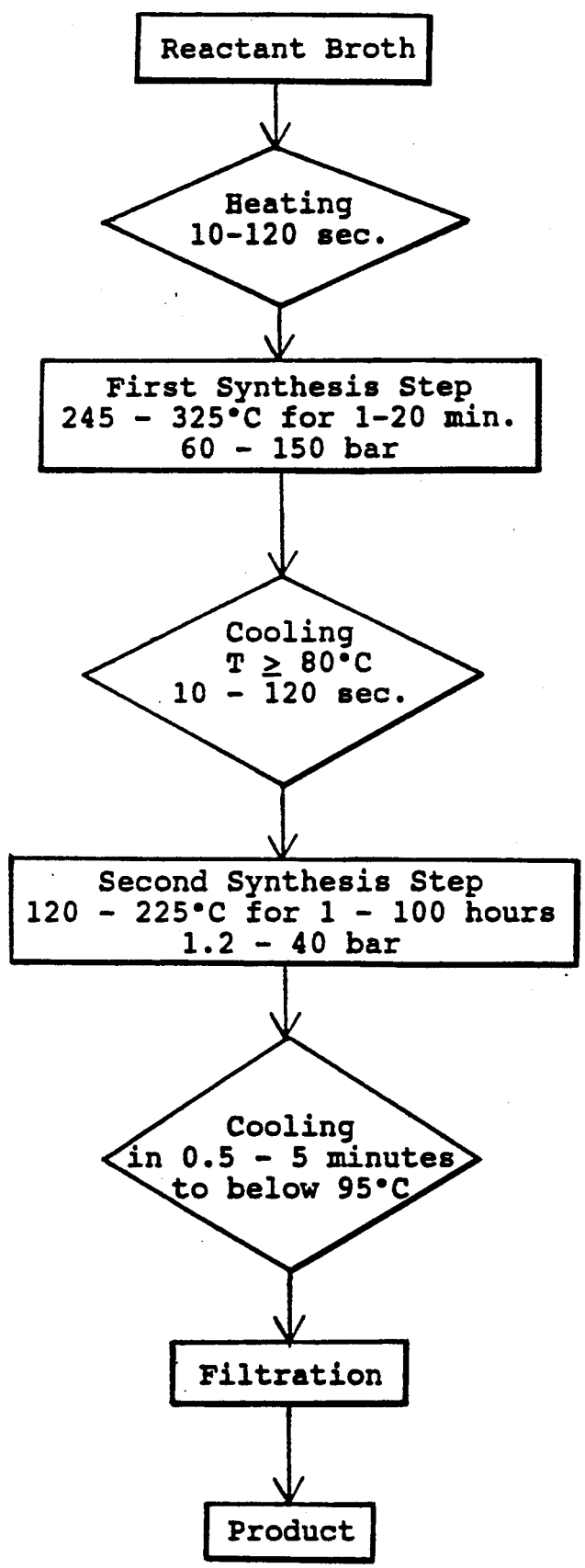
FIG. 1 shows, in outline form, a preferred embodiment of the zeolite synthesis method of the present invention.

It has now been ascertained that a method for the rapid crystallization of aluminosilicate is available. The method avoids the formation of unwanted secondary phases by using a procedure having two crystallization steps.

For the first step, the reactants (including water glass, solutions of aluminum sulfate and sodium sulfate, and sulfuric acid) are mixed and heated to between about 240° and about 325° C. and under a pressure of between about 60 and about 150 bar. The admixture is preferably performed under turbulent flow conditions to form a crystallization broth. Turbulent flow accelerates mixing and heat transfer, thereby minimizing crystallizations that occur before the preferred temperature and mixture of reactants is obtained. Turbulent flow conditions also accelerate the crystallization of the desired product and avoid the formation of undesired by-products. The turbulent flow conditions are characterized by a Reynolds number that is higher than 2000.

The admixture of the initial reactant suspension can be performed discontinuously (as a batch). The batch suspension can be stored for up to 14 days and thereafter subjected to the high temperature, high pressure, first crystallization step. The initial mixing step can also be performed in a static apparatus and the mixture immediately thereafter subjected to the first crystallization step (comprising exposure to high temperature—high pressure conditions). The mixing and storage of the initial reactant suspension has to be done at temperatures below 100 Celsius, preferably at temperatures between 50° and 70° C. at atmospheric pressure with the pH between 10 and 12.

The start of the crystallization step requires the mixture to be at a temperature in excess of 100° C. Hence, this step must be performed under self-generated pressure. This crystallization step must be carried out in an apparatus that can withstand high temperatures (of up to 500° C. or more) and high pressures (up to 150 bar). One suitable apparatus is a tube reactor of the type disclosed in Assignee's U.S. Pat. Nos. 3,497,317 and 4,361,541.

After heating and mixing the reactants under turbulent flow conditions, a first crystallization step is performed by maintaining the broth at a pre-selected temperature (between about 240° C. and about 325° C.) for between about 1 and about 20 minutes. Then, the temperature of the crystallization broth is reduced by at least 80° C. until the temperature of the second crystallization step is achieved. The preferred temperature range of the reactant mixture for the second crystallization step is between about 120° C. and about 225° C. (pressure ranges from about 1.2 to 40 bar). The second crystallization step conditions are maintained for between about 1 and about 100 hours. After the second crystallization step has been concluded, the crystallization broth is cooled to below 95° C., filtered, and an aluminosilicate material containing crystalline aluminosilicate is recovered.

Preferably, the first crystallization step is initiated by mixing and heating the reactants, within about one minute, from ambient temperature to a temperature between 250° and 325° C. (At these temperatures (250° C. to 325° C.), the pressure ranges between 60 and 150 bar). After a residence time of 5-15 minutes at the maximum temperature selected, the crystallization broth is cooled, within about 1 minute, from the initial step temperature to below 245° C. Preferably, the crystallization broth is cooled to a temperature at least 80° C. less than the initial step temperature.

The second crystallization step must be performed in a pressurized chamber (e.g. an autoclave or a tube reactor) under autogenous pressure. The pressure achieved during the reaction is a function of the temperature of the reaction mixture (internal pressure in the chamber is a function of vapor pressure). The Reynolds number of the broth can be below 2000.

The preferred mode of operation of the method of the present invention is described in greater detail as follows:

A reactant suspension of, for example, water glass, aluminum sulfate, sodium sulfate and sulfuric acid, having the following molar proportions
$SiO_2/Al_2O_3 = 20$ to $60$
$OH^-/SiO_2 = 0.10$ to $0.20$
$H_2O/SiO_2 = 20$ to $60$
is supplied to the receiving well of a piston diaphragm pump. The reactant suspension materials can be mixed as a batch, the batch stored for up to 14 days, and thereafter subjected continuously to the high pressure, high temperature first crystallization step. The pump delivers the reactant suspension into a pipe system consisting of several heat exchangers (usually 3 or 4), which are designed so that the designated amount of suspension can be heated in between 10–120 seconds, and preferably in about 1 minute from ambient temperature of 17° C. to about 300° C. High-pressure steam, heated thermal oil, salt or electrical heating can be used as the heat source for the heat exchangers. A salt melt mixture that may be used in the heating step is offered by DuPont under the name HiTec. This salt can be used at temperatures between 150° C. and 540° C. After mixing and heating in the pipe system, the reactant suspension forms a crystallization broth in which the crystallization process has begun.

After exposure to the heat exchangers, the crystallization broth moves into a pipe segment having a predetermined length. The length of the pipe segment is sufficient to ensure that the crystallization broth has a residence time of 5 to 15 minutes at the first crystallization step temperature (245° C. to 325° C.). The pipe diameter for this segment and for the pipe segment passing through the heat exchangers is selected so that turbulent flow of the crystallization broth is obtained at the specified pressures and flow rate. In general, pipe diameters of between 1 and 35 cm are employed. The pipe segments generally have a total length of between 1000 and 5000 meters. The level of turbulence useful in practicing the mixing and heating process of the present invention is characterized by a Reynolds number of $\geq 2 \times 10^3$, preferably $\geq 5 \times 10^4$.

After passing through the predetermined length of pipe segment and undergoing the first crystallization step, the crystallization broth is cooled, either by relieving the pressure or by heat exchange, to the temperature desired for the second crystallization step (120° C. to 225° C.). Further crystal growth occurs during this second crystallization step. To achieve optimum crystallinity, the second crystallization step conditions are preferably maintained for about 5 hours to about 10 hours at temperatures from 180° C. to 220° C. The requisite second step temperatures are achieved by heating the crystallization broth in an autoclave for the predetermined time period.

At the end of the second crystallization step, the reaction mixture is cooled for between 1 and 5 minutes to a temperature below 95° C. by relieving the pressure in the autoclaves or by passage through a heat exchange apparatus. The time for the second crystallization step can be reduced by addition of crystallization nuclei to the initial reactant suspension (i.e., seed crystals). The crystallization nuclei comprise zeolitic material, e.g. the material of example 1.

A flow diagram of the method of the present invention is shown in FIG. 1.

The invention is explained in greater detail in the following examples which illustrate the operation of the invention.

EXAMPLE 1

A reactant suspension composed of solutions of Na water glass, aluminum sulfate and sulfuric acid, having the following molar proportions is prepared.

$SiO_2/Al_2O_3 = 27$
$OH^-/SiO_2 = 0.14$
$H_2O/SiO_2 = 30$

The temperature of the suspension is 60° C. The suspension is supplied continuously from the receiver container of a piston pump to a continuous pipe system. The reactant suspension is heated within 1 minute from approximately 60° C. to 270° C. in a pipe system having 3 heat exchangers to form a crystallization broth. After remaining for 10 minutes at this temperature in a segment of the pipe, the crystallization broth is cooled to 185° C.

Subsequently, the crystallization broth is fed into a series of interconnected residence-time autoclaves where it is treated hydrothermally (i.e., by exposure to hydrothermal conditions) by being held for, on the average, 10 hours at 185° C. The broth is then cooled to about 60° C. in a series of autoclaves connected to the residence-time autoclaves. The cooling is accomplished by relieving the pressure within the autoclaves and by heat exchange. The crystallization broth, containing crystalline aluminosilicate, is drawn off continuously and filtered. The filter cake contains 60% pentasil zeolite and, aside from amorphous portions, no secondary crystalline phases.

EXAMPLE 2

Pentasil-zeolite crystals produced in Example 1 are added (2% weight pentasil-zeolite/100% weight of $SiO_2$ in suspension) to a reactant suspension, composed of solutions of Na water glass, aluminum sulfate and sulfuric acid, with the molar proportions of $SiO_2/Al_2O_3 = 27$
$OH^-/SiO_2 = 0.14$
$H_2O/SiO_2 = 30$ and having a temperature of 60° C. The Example 1 product is added to provide crystallization nuclei. The nuclei containing reactant suspension is fed continuously from the receiver container of a piston pump to a pipe system having 3 heat exchangers, where it is heated within 1 minute to 270° C. to form a crystallization broth. After a residence time of 10 minutes at 270° C. in a segment of the pipe, the reaction mixture is cooled to 185° C.

The reaction mixture is then fed into a cascade of residence-time autoclaves (i.e. autoclaves in which the mixture is held for a period of time), where it is treated hydrothermally by being maintained, on the average, for 10 hours at 185° C. The broth is cooled to a temperature of about 60° C. in autoclaves connected to the residence-time autoclaves. The cooling is accomplished by relieving the pressure within the autoclave and by passing the fluid through one or more autoclaves which serve as heat exchange devices. The crystallization broth is drawn off continuously and filtered. The filter cake contains 95% pentasil zeolite and, aside from amorphous portions, no secondary crystalline phases.

EXAMPLE 3

A reactant suspension, composed of solutions of Na water glass, aluminum sulfate and sulfuric acid, having the following molar proportions, $SiO_2/Al_2O_3 = 40$
$OH^-/SiO_2 = 0.14$
$H_2O/SiO_2 = 40$ and a temperature of 60° C. is supplied continuously from the receiver container of a piston pump to a pipe system having 3 heat exchangers. This reactant suspension is heated within 1 minute to 270° C. in the pipe reactor to form a crystallization broth. After a residence time of 10 minutes at this temperature in a segment of the pipe, the crystallization broth is cooled to 185° C.

Subsequently, the reaction mixture is fed into a cascade of residence-time autoclaves, where the mixture is exposed to hydrothermal conditions by being held in the sealed autoclave container on the average, for 10 hours at 185° C. The broth is then cooled to about 60° C. by passage through autoclaves that are connected to the residence-time autoclaves. The cooling is accomplished by relieving the pressure and by heat exchange in the autoclaves. The crystallization broth is drawn off continuously and filtered. The filter cake contains 50% pentasil zeolite and, aside from amorphous portions, no secondary crystalline phases.

EXAMPLE 4

The nuclei product from Example 3 is added (2% weight/100% $SiO_2$) to a reactant suspension composed of solutions of Na water glass, aluminum sulfate and sulfuric acid and having the following molar proportions.

$SiO_2/Al_2O_3 = 40$
$OH^-/SiO_2 = 0.14$
$H_2O/SiO_2 = 40$ and having a temperature of 60° C. The product of Example 3 is added to provide crystallization nuclei. The nuclei containing reactant suspension is continuously fed from the receiver container of a piston pump to a pipe system having 3 heat exchangers where it is heated within 1 minute to 270° C. to form a crystallization broth. After remaining for 10 minutes at 270° C. in a segment of the pipe, the reaction mixture is cooled to 185° C.

The reaction mixture is then fed into a cascade of residence-time autoclaves, where it is exposed to hydrothermal conditions for, on the average, 10 hours at 185° C. The mixture is then cooled in autoclaves (that are connected to the residence-time autoclaves) to about 60° C. by relieving the pressure in the autoclaves and by heat exchange. The crystallization broth is drawn off continuously and filtered. The filter cake that is recovered contains 80% pentasil zeolite and, aside from amorphous portions, no further secondary crystalline phases.

We claim:

1. A method for preparing crystalline zeolite aluminosilicates comprising:

forming a reactant suspension having an $SiO_2:Al_2O_3$ molar ratio of greater than 20;

mixing the reactant suspension;

heating the reactant suspension to a first crystallization temperature of between about 240° C. and about 325° C. to form a crystallization broth;

maintaining said crystallization broth at said first crystallization temperature for between about 1 and about 20 minutes;

cooling the crystallization broth to a second temperature of between about 120° C. and about 225° C.;

maintaining said crystallization broth at said second temperature for between about 1 hour and about 100 hours and;

recovering a crystalline zeolite aluminosilicate product from said broth.

2. The method of claim 1, which comprises heating said suspension to said first crystallization temperature in about 10 to about 120 seconds.

3. The method of claim 1, which comprises cooling said crystallization broth from said first crystallization temperature to said second temperature within a period of about 10 to about 120 seconds.

4. The method of claim 3, wherein said cooling step comprises reducing the temperature of said crystallization broth by at least 80° C. from said first crystallization temperature.

5. The method of claim 3 which further comprises cooling said crystallization broth from said second temperature to a temperature below 95° C. within about 0.5 to about 5 minutes immediately prior to said recovering step.

6. The method of claim 5 wherein said second temperature is between about 160° C. and about 200° C.

7. The method of claim 1 wherein said reactant suspension has the following molar proportions:
$SiO_2/Al_2O_3 = 20$ to 60
$OH/SiO_2 = 0.10$ to 0.20
$H_2O/SiO_2 = 20$ to 60.

8. The method of claim 1 wherein said reactant suspension has the following molar proportions:
$SiO_2/Al_2O_3 = 20$ to 40
$OH/SiO_2 = 0.13$ to 0.18
$H_2O/SiO_2 = 25$ to 40.

9. The method of claim 1 which comprises maintaining said crystallization broth at said second temperature in a sealed vessel.

10. The method of claim 9 wherein said sealed vessel comprises an autoclave.

11. The method of claim 1 which comprises exposing said crystallization broth to an autologous pressure of between about 60 and about 150 bar while said crystallization broth is maintained at said first crystallization temperature.

12. The method of claim 1 wherein said second crystallization temperature is between about 180° C. and 220° C.

13. The method of claim 12 which comprises maintaining said crystallization broth at said second temperature for between about 5 and about 10 hours.

14. The method of claim 1 which comprises adding crystallization nuclei to said crystallization broth.

15. The method of claim 1 which comprises performing said mixing step under turbulent flow conditions.

16. The method of claim 15 which comprises maintaining a Reynolds number above 2000 during said mixing step.

* * * * *